H. SYKES.
FLEXIBLE COUPLING FOR TRANSMISSION OF POWER.
APPLICATION FILED NOV. 8, 1917.

1,297,507.

Patented Mar. 18, 1919.

INVENTOR:
Henry Sykes
BY
M Wallace White
ATTY

H. SYKES.
FLEXIBLE COUPLING FOR TRANSMISSION OF POWER.
APPLICATION FILED NOV. 8, 1917.

1,297,507.

Patented Mar. 18, 1919.
3 SHEETS—SHEET 2.

INVENTOR:
Henry Sykes
BY
ATT'Y.

UNITED STATES PATENT OFFICE.

HENRY SYKES, OF SHEFFIELD, ENGLAND.

FLEXIBLE COUPLING FOR TRANSMISSION OF POWER.

1,297,507.  Specification of Letters Patent.  Patented Mar. 18, 1919.

Application filed November 8, 1917. Serial No. 200,857.

*To all whom it may concern:*

Be it known that I, HENRY SYKES, subject of England, residing at 32 Dixon road, Hillsborough, Sheffield, in the county of York, England, have invented new and useful Improvements in Flexible Couplings for Transmission of Power, of which the following is a specification.

My invention consists in an improved and simplified form of construction of couplings of the above described type having the driving and driven portions separated from one another by flat inserts of rubber or similar resilient material, in such a manner that in conjunction with a specially formed annular concave recess in the half flange coupling portion, the two portions of the couplings can be efficiently and effectively driven when not in exact alinement due to wear or other causes, which form of construction tends to an increased duration of life of the parts, provides an electrical insulating medium between the two metallic parts of the coupling, and facilitates the carrying out of repairs when necessary.

My invention will be better understood on reference to the accompanying two sheets of drawings in which—

Figure 1, Sheet 1, is a side elevation of a coupling made according to my invention showing the two parts in engagement.

Fig. 2 is a part sectional front elevation of the two parts of my improved coupling separated from one another.

Fig. 3, Sheet 2, is a side elevation of the pocket portion of a coupling.

The same letters refer to similar parts throughout the several views.

Figure 1:
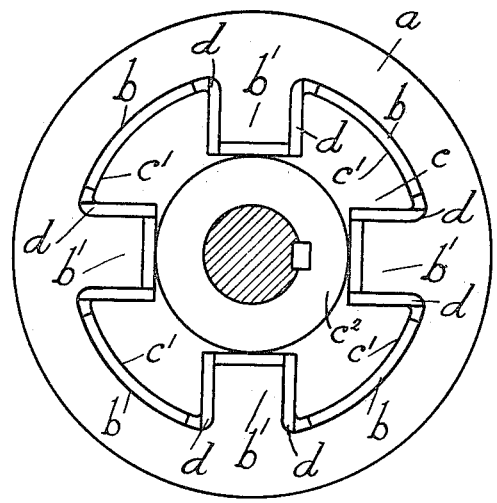
Figure 2:
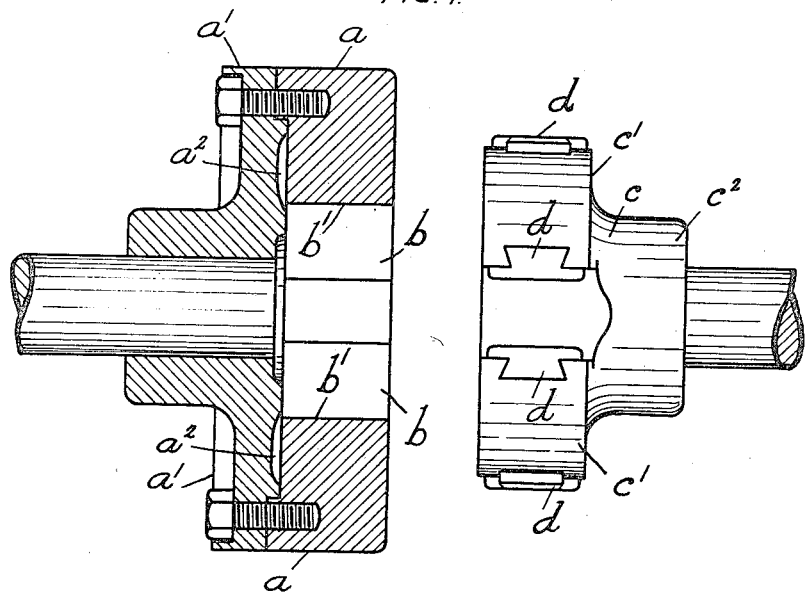
Figure 3:
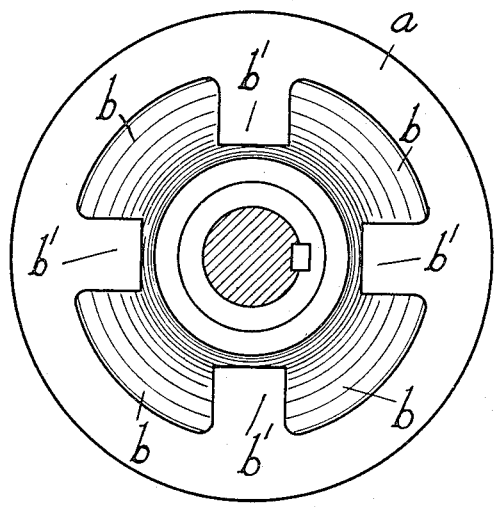
Figure 4:
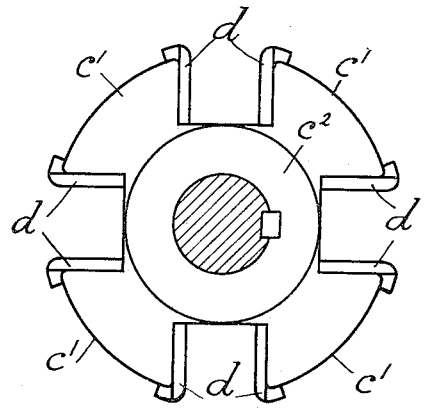
Fig. 4, is a similar view of the tenon portion.

According to my invention I form my improved coupling somewhat after the fashion of what is known as a crab coupling, *i. e.*, the outer and larger portion $a$, of the coupling is circular in form and provided with segmental pockets or recesses $b$, to receive segmental and radially disposed tenons $c^1$ on the inner and smaller portion $c$ fitting within the portion $a$. The pocket portion $a$, of my improved coupling is bolted up to a flange $a^1$, on the shaft of the machine to which the connection is to be made. The number of segmental pockets $b$, provided may be varied according to circumstances and the size of coupling, a convenient number however for general purposes, is four. These pockets $b$, are separated from one another by inwardly projecting jaws $b^1$, which form the abutments for transmitting the drive from the inner and tenon portion $c$, of the coupling. This last named part $c$, has the segmental tenons $c^1$ arranged radially around a concentric boss $c^2$, fitted upon or made integral with the driving or the driven shaft. The tenons $c^1$, are of a similar contour to the pockets $b$, into which they enter but are of less size than said pockets, so that a space is left between the entire outer periphery of the tenon portion and the inner periphery of the pocket portion. A portion of this space is occupied by blocks of rubber or other resilient substance $d$, secured to the tenons $c^1$. These rubber blocks $d$, are preferably secured to the perpendicular or radial faces of the tenons, and extend from the root of each tenon (on both sides) outwardly to such a distance as will permit of the easy insertion of the tenon portion $c$, into the pocket portion $a$. From this it will be seen that the two metallic portions of the coupling are kept apart from one another by these rubber blocks $d$, and that the rotary motion of one is imparted to the other through them.

The rubber blocks $d$, may be secured to the tenons $c^1$, in any convenient way but the one I preferably adopt is to mold them with dovetail back portions to fit into correspondingly shaped recesses in the tenons.

When the two parts $a$ and $c$, of the coupling are assembled the faces of the rubber blocks, $d$, are slightly in compression so that when the driving force is acting through one of the blocks on one side of each tenon, whereby it is of course further compressed, the rubber block on the other side of the tenon is allowed to expand. In this way there is no "knock" or "backlash" when the coupling is subjected to sudden shocks, or when the motion is first imparted to it or when the direction of rotation is reversed.

In couplings of this type it is desirable to make provision for longitudinal expansion of the shafts which are connected, and also to provide for the two shafts getting out of alinement through the more rapid wear in the bearings of one than the other. In order to meet the first of these contingencies, in assembling the two parts of the coupling I do not push the tenon portion right home within the pocket portion but I leave a little space between the end of the one and the inner face of the other.

Figure 7:
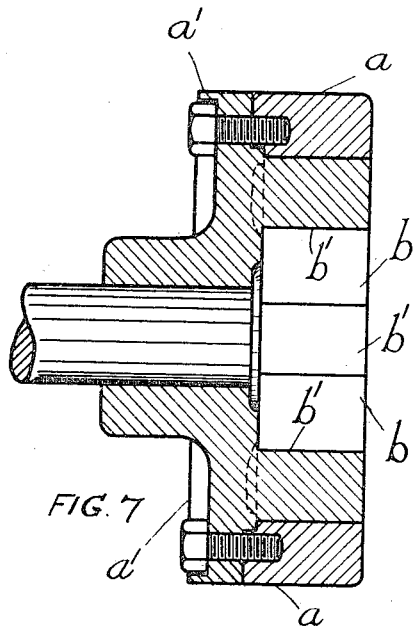
Fig. 7 is a sectional elevation of an alternative form of construction of my improved coupling.

To provide for the case of one of the shafts getting out of alinement with the other, I form on the inner face of the flange coupling $a^1$, on the driven shaft, an annular concave recess $a^2$, so positioned that should there be any slight tilting of the driver shaft due to excessive wear in the bearings, the rubber supporting blocks will allow this tilting to take place, and the annular concave recess permits of the end of the tenon portion accommodating itself in the new position as shown in Fig. 7.

It will be understood that in lieu of securing the rubber blocks to the tenon portion they may be secured to the inwardly projecting jaws of the pocket portion. Also when the blocks are made of rubber I have them impregnated with graphite to induce lubrication and reduce friction.

Figure 5:
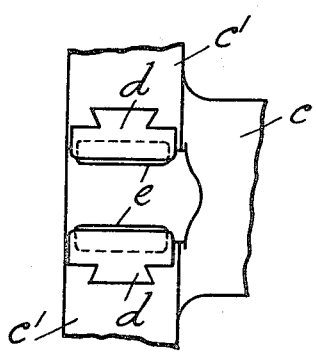
Figs. 5 and 6 are a part plan and side elevation respectively of a modified form of tenon portion which I sometimes employ.
Figure 6:
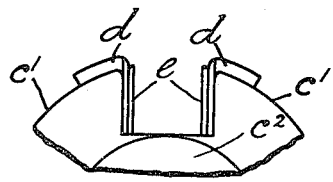

In some cases where there is a tendency for a longitudinal movement to be set up between the two parts of a coupling, as in the event of the two connected shafts not being in exact alinement, I provide fillets $e$, of phosphor bronze or other suitable metal, embedded in the rubber blocks $d$, as shown in Figs. 5 and 6. By making this provision there is no binding or tearing of rubber such as might occur should there be rapid and frequent longitudinal movement of the tenon portion in relation to the pocket portion.

Figure 8:
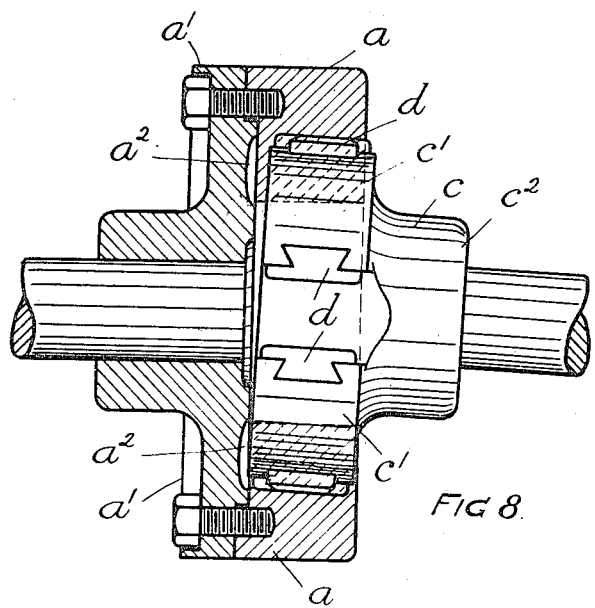
Fig. 8 is a sectional elevation showing the two portions of the coupling disalined.

As an alternative means of construction instead of forming inwardly projecting jaws on the pocket portion of the coupling, I provide longitudinal arms attached to or made integral with the flange coupling secured to the said pocket portion as shown in Fig. 8. By this means instead of the driving force being transmitted through the set screws which hold the coupling to the pocket portion, it is transmitted through these last named arms which engage with the rubber blocks on the tenon portion of the coupling.

Having now described my invention what I claim as new and desire to secure by Letters Patent is:—

1. A shaft coupling comprising coupling members, one of said members being formed at intervals with radially disposed tenons, cushioning blocks secured to the confronting sides of said tenons, and having portions thereof disposed upon the peripheries of said tenons, the second coupling member being formed at intervals with radially disposed pockets corresponding in contour and adapted to receive said tenons and blocks, whereby said blocks will be interposed between the confronting faces of said tenons and the walls of said pockets.

2. A shaft coupling as embodied in claim 1, the said second coupling member comprising separable sections, one of which is formed with said pockets, while the other is provided with an annular concave recess to permit the coupling members to be disalined.

3. A flexible coupling having an outer pocket portion and an inner tenon portion separated from each other radially and circumferentially by flat rubber cushioning blocks, and metal fillets embedded in said cushioning blocks substantially as herein described.

In testimony whereof I have signed my name to this specification in the presence of two subscribing witnesses.

HENRY SYKES.

Witnesses:
GEORGE S. SHANNAN,
FRANK WALKER.

Copies of this patent may be obtained for five cents each, by addressing the "Commissioner of Patents, Washington, D. C."